(12) United States Patent
Ingram

(10) Patent No.: US 6,394,556 B1
(45) Date of Patent: May 28, 2002

(54) PRESS-EXPANSION PLUG FILTER ASSEMBLY FOR USE WITH AIR PRESSURE INFLATION SYSTEMS FOR TRACTOR TRAILER TIRES

(76) Inventor: Anthony L. Ingram, 235 Brees, San Antonio, TX (US) 78209

(*) Notice: Subject to any disclaimer, the term of this patent is extended or adjusted under 35 U.S.C. 154(b) by 0 days.

(21) Appl. No.: 09/524,258

(22) Filed: Mar. 14, 2000

Related U.S. Application Data

(60) Provisional application No. 60/124,492, filed on Mar. 15, 1999.

(51) Int. Cl.[7] .......................... B60B 35/00; B60B 27/00; B01D 24/00; B01D 39/00
(52) U.S. Cl. ................................ 301/124.1; 301/108.1; 55/522
(58) Field of Search .......................... 301/108.1, 108.4, 301/124.1; 55/522

(56) References Cited

U.S. PATENT DOCUMENTS

| | | | |
|---|---|---|---|
| 5,492,393 A | * | 2/1996 | Peisker et al. ............ 301/108.4 |
| 5,538,330 A | * | 7/1996 | Ehrlich ..................... 301/124.1 |
| 5,584,949 A | * | 12/1996 | Ingram ..................... 301/108.1 |
| 5,752,746 A | * | 5/1998 | Perry ........................ 301/108.4 |
| 5,860,708 A | * | 1/1999 | Borders et al. ........... 301/108.4 |
| 6,024,417 A | * | 2/2000 | Jones, II et al. ......... 301/124.1 |
| 6,105,645 A | * | 8/2000 | Ingram ......................... 152/415 |
| 6,325,463 B1 | * | 12/2001 | Sitter et al. .............. 301/124.1 |

* cited by examiner

*Primary Examiner*—S. Joseph Morano
*Assistant Examiner*—Jason R. Bellinger
(74) *Attorney, Agent, or Firm*—Lyon & Lyon LLP

(57) ABSTRACT

An expansion plug filter assembly adapted to be mounted in an axle spindle for communicating filtered air from an axle to a rotary union assembly in a tire inflation system. The assembly includes a head portion, a body portion, an internal air flow channel extending longitudinally through the head and body portions. A press plate cavity is provided in the head portion of the assembly. A filter unit is carried by the body portion and a press plate is disposed within the press plate cavity. An o-ring mounted in a groove about the head portion provides an airtight seal between the head portion and the interior of the axle spindle. Tightening a plurality of securement bolts embedded in the head portion draws the press plate into the press plate cavity and causes a downstream portion of the head portion of the assembly to expand against the spindle to releasably secure the assembly within the spindle such that air passing therethrough is first caused to flow through the filter unit.

26 Claims, 1 Drawing Sheet

PRESS-EXPANSION PLUG FILTER ASSEMBLY FOR USE WITH AIR PRESSURE INFLATION SYSTEMS FOR TRACTOR TRAILER TIRES

RELATIONSHIP TO PRIOR APPLICATION

This utility application relates to co-pending U.S. Provisional Patent Application Serial No. 60/124,492, filed on Mar. 15, 1999 the disclosure of which is hereby incorporated by reference.

SUMMARY OF THE INVENTION

The present invention generally concerns plug filter assemblies, and more specifically expansion plug filter assemblies for communicating pressurized air from an axle spindle to a rotary union assembly. The expansion plug filter assembly of the preferred embodiment is inserted into the axle spindle, wherein the assembly is sealably secured against the interior wall of the axle spindle by an external o-ring to form a first seal and by an expandable press plug assembly that provides a second seal.

DETAILED DESCRIPTION

Figure 2:
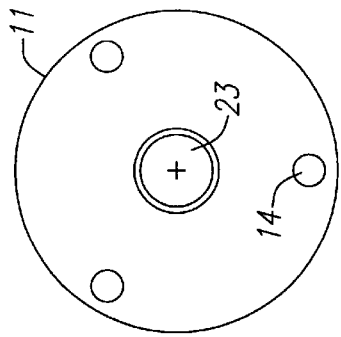
FIG. 2 is an end view of a press plug shown in FIG. 1.
Figure 1:
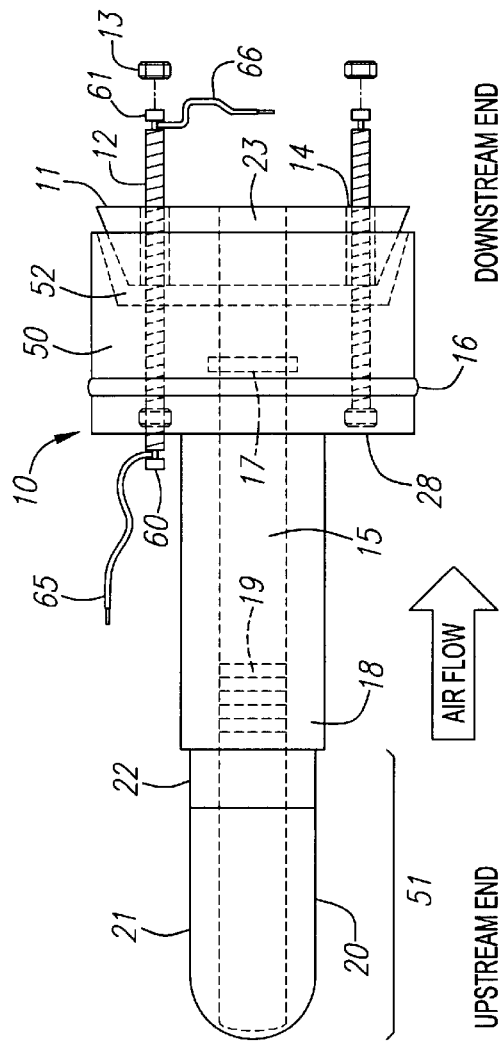
FIG. 1 is a sectional side view of an expansion plug filter assembly according to a preferred embodiment of the present invention.
Figure 3:
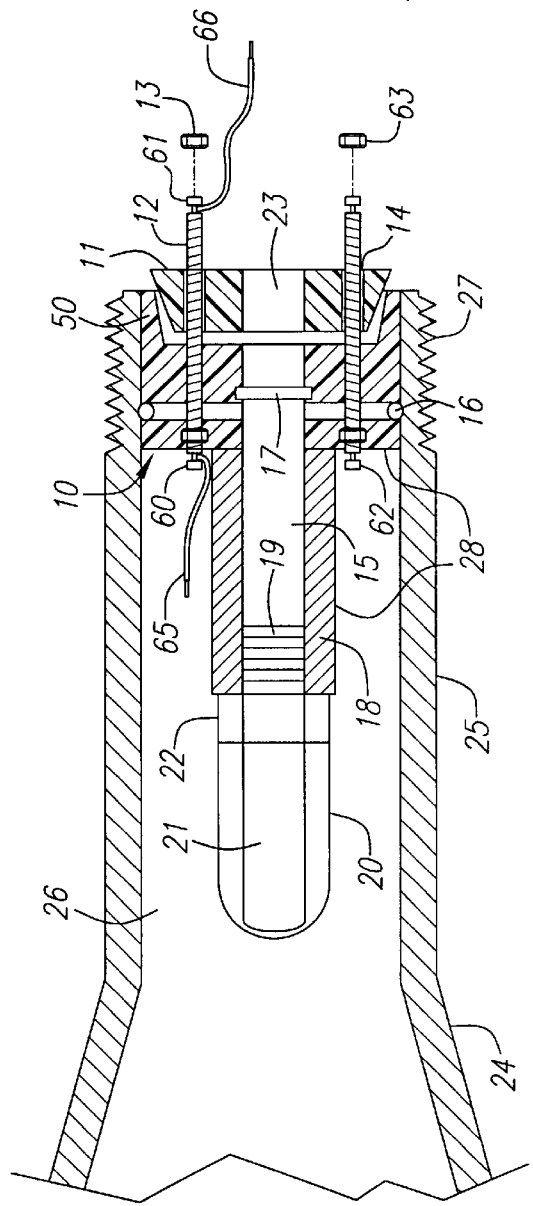
FIG. 3 is a sectional side view of the present invention mounted inside an axle spindle.

Central tire inflation systems on tractor trailers use compressed air as a source of pressurized air to fill a leaking tire while the trailer is in motion. Air is directed from the control box to the leaking tire through one of the trailer's axles, which either carries an air line from the control box, or is sealed and functions as an air conduit. Pressurized air carried by the axles communicates with each pair of trailer tires mounted thereon through a press plug assembly located at the end of the pressurized axle.

The pressurized air is communicated through a rotary union assembly, which in turn directs the air to valve stems on the rotating tires. A preferred rotary union assembly is disclosed in U.S. Pat. No. 6,105,645 titled "ROTARY UNION ASSEMBLY FOR USE IN AIR PRESSURE INFLATION SYSTEMS FOR TRACTOR TRAILER TIRES", issued to Applicant Aug. 22, 2000. Applicant incorporates herein by reference the specification therein. Between each rotary union assembly and its associated tires, pressure responsive valves are employed so that upon the occurrence of a leak in one of the tires, the resulting pressure loss will cause one of the valves to open and allow air flow from the rotary union assembly to pass therethrough to the leaking tire.

A plug filter assembly located at the end of the pressurized axle communicates pressurized air carried by the axles to each pair of trailer tires mounted thereon through a rotary union assembly by which air flow is directed from a stationary air line to the valve stems on the rotating tires. Pressurized air in the axles communicates with the plug filter assembly, through an air passage tube which extends through the assembly into the pressurized axle, on the one end, and into the wheel lubrication compartments adjacent to the ends of the axles on the other end. The pressurized air is then communicated with each pair of trailer tires mounted thereon through the rotary union assembly.

While these central tire inflation systems are well known and in widespread use, communication between the pressurized air in the hollow axle spindles and the plug filter assembly suffers several shortcomings.

For example, current press plug air passage tube systems employ a cone shaped press plug with an outside o-ring seal that must be forceably installed in the spindle end of the axle. This can cause damage to the o-ring seal and the interior wall of the spindle during installation. When the o-ring is damaged, the seal is compromised which can allow air into the wheel lubrication compartment. Any air leakage into the wheel lubrication compartment causes air pressure build up within the compartment which can damage the oil seals therein and create an oil leak. If the wheel bearings lose their lubrication, they will seize up and can cause a fire.

The present invention provides an expansion plug filter assembly which eliminates the need to forceably install the assembly, which in turn eliminates the possibility of air leaks through a damaged seal. As a result, the present invention provides a substantial improvement in the integrity of the wheel lubrication compartment.

An additional problem facing central tire inflation systems utilizing the press plug air passage tube system includes the introduction of dust, rust particles and debris into the rotary union or seal. Current systems employ a screen filter located on the end of the air passage tube extending into the pressurized spindle which allow passage of particles approximately 80–120 microns in size. This is approximately the size of a grain of sand. These particles, when introduced, can deteriorate and damage the rotary seal as well as potentially deteriorate and damage the wheel gears and seals inside the wheel lubrication compartment.

The present invention provides a 10 micron polypropylene filter attached to the end of the press/expansion plug filter assembly. This filter eliminates the introduction of any particles greater than 10 microns in size and provides a substantial improvement in the integrity of the rotary seal and wheel lubrication compartment.

Another problem facing central tire inflation systems utilizing the press plug air passage tube system includes removal of the press plug for maintenance or cleaning of the axle. The interior of a trailer axles contain rust particles, dust and debris as a result of the manufacturing process. Current systems utilize a press plug which must be forceably removed to clean the axle. This removal typically destroys the press plug and can damage the interior of the spindle to such an extent that it will not seal around a new press plug which can result in the impossibility of a central tire inflation system being used on that axle.

The present invention provides an expansion plug filter assembly which can be easily removed by backing off the tension on the expansion bolts and sliding the assembly out of the spindle. Once the assembly is removed, the threaded filter can be serviced or replaced, the axle cleaned, and the existing present invention reinstalled into the spindle. As a result, the present invention provides a substantial improvement in the accessability, maintenance and/or replacement of the fitter and cleaning of the spindle.

In some axle assemblies, electrical wires communicate through the interior of axles to wheel assemblies. For example, an automatic braking system may be controlled by a centralized device which communicates to the wheels through wires sent through axle interiors. The present invention allows communication of electrical current from the interior of the axle spindle to the wheel assembly across the expansion plug filter assembly.

In a preferred embodiment, tension bolts embedded in the head of the expansion plug assembly extend out of the head. These tension bolts are made of an electrically conductive material such as steel. Electrical terminal connections are attached at the ends of the tension bolts. In the upstream end of the tension bolt, a female electrical terminal connection receives electricity. As electricity is conducted to the downstream end portion of the tension bolt, a male electrical terminal connection relays the current. Furthermore, electrically non-conductive material, preferably hard plastic, may be used to coat the bolts to keep current passing through one bolt from communicating to another bolt. Also, a teflon insert around the bolt may be used. Each bolt preferably permits a separate wire to communicate current through each bolt.

The present invention provides an expansion plug filter assembly which provides for re-useable spindle plugs in central tire inflation systems. The present invention provides an expansion plug filter assembly which eliminates the introduction of foreign particles, greater than 10 microns in size, to the rotary union and wheel lubrication compartments in central tire inflation systems.

Referring now in detail to the drawings, the expansion plug filter assembly 10 of the present invention, while useable with a central tire inflation system on a wide variety of movable vehicles employing stationary axles with hollow spindles for automatically maintaining the inflation pressure of pneumatic tires thereon, is particularly adapted for use on tractor trailers. Accordingly, the assembly 10 will be described in conjunction with a stationary tractor trailer axle 24. While identical expansion plug filter assemblies 10 are provided at the end of each axle on the trailer to communicate with a rotary union (not pictured) to maintain the inflation pressure of the tires carried thereby, reference will be made to only one such assembly 10 and the axle spindle 25 it is installed in.

The expansion plug filter assembly 10 comprises generally a filter unit 51, a press plug assembly 28, and a press plate 11. Through those components in that order, compressed air travels from the upstream axle spindle to the downstream rotary union assembly (not pictured).

The press plug assembly 28 comprises a body portion 18, a head portion 50 and an internal air flow channel 15 that runs centrally and longitudinally along and through the length of the head and body portions. An internal o-ring 17 is mounted in a groove around channel 15. A tube (not pictured) extends from the rotary union housing to press plug assembly 28. When inserted into the internal air flow channel 15, the o-ring 17 forms an airtight seal about the tube.

The press plug assembly 28 further comprises an external o-ring 16 which is mounted in a groove around the head portion 50 of the press plug assembly 28. As the expansion plug filter assembly is slid into the interior 26 of the axle spindle 25, the external o-ring 16 contacts the interior 26 of the axle spindle 25 and provides an airtight seal between the assembly 28 and the axle spindle 24.

The press plug assembly 28 further comprises threaded tension bolts 12 that are embedded longitudinally in the head portion 50. The downstream ends of the tension bolts 12 extend out of the head portion 50 into the press plate cavity 52. In one embodiment, the upstream ends of the tension bolts 12 are embedded in the head portion 50, while in another embodiment, the upstream ends extend outwardly of the head portion 50. The tension bolts 12 are preferably made of electrically conductive material, such as steel, while the press plug assembly 28 is preferably made of an expandable material such as molded plastic. Preferably three, and more preferably four tension bolts 12 are embedded in the head portion 50.

In a preferred embodiment, tension bolts 12 further comprise electrical terminal connections 60–63 to communicate electric current from wires 65 in axle interior 26 to wires 66 in the wheel assembly. For example, tractor trailers equipped with anti-lock braking systems employ electrical wires 65 through hollow axles to the anti-lock braking systems. In such embodiments, the upstream end of the tension bolt 12 extending out of the head 50 may serve as a female electrical terminal connection 60 to receive electrical current, while the downstream end of the extension bolt 12 may serve as a male electrical terminal connection 61 for transmitting electrical current, thereby communicating electrical current from the interior of the axle spindle to the wheel assembly.

The downstream portion of the head 50 comprises a press plate cavity 52 for receiving a press plate 11. The cavity's cross sectional circumference increases toward the downstream portion, and the press plate's cross sectional circumference also increases toward the downstream portion so as to define frustoconical configurations. However, the average circumference of the press plate 11 is greater than the average circumference of the press plate cavity 52. Thus, as the press plate 11 is slid into the cavity 52, the press plate 11 fits only partially into the cavity 52.

Once the press plate 11 is inserted into the cavity 52, a nut 13 is screwed onto each threaded tension bolt 12 and tightened. Tension bolts 12 extend through the press plate 11 through holes 14. Since the head portion 50 and body portion 18 of the expansion plug assembly 10 is made preferably of molded plastic, tightening the nuts 13 presses the press plate 11 into the press plate cavity 52 and expands the downstream end of the head 50 outwardly against the interior of the axle spindle 25 to removably secure the expansion plug filter assembly 10 within the interior of the axle spindle 24.

The body portion 18 of the press plug assembly further comprises a threaded receptacle 19 in the upstream portion for receiving the filter unit 51. The filter unit 51 comprises a filter 20, preferably a 10 micron filter, a threaded end 22, preferably made of polypropylene, and an internal filter channel 21 which communicates with the interior pressplug-assembly channel 15.

The expansion plug filter assembly 10 is installed interiorly at the end of the axle spindle 25 as above described and the tube carried by and communicating with the rotary union assembly is inserted into the air flow channel 15 and sealed by the surrounding internal o-ring 17 in assembly 10. Pressurized air in the stationary axle interior 26 then flows through the threadably attached 10 micron filter 20 into channel 15, through the press plug assembly 28 and into the rotary union which then distributes the filtered air to underinflated tires as necessary.

Various changes and modifications may be made in carrying out the present invention without departing from the spirit and scope thereof. Insofar as these changes and modifications are within the purview of the foregoing, they are to be considered as part of the present invention.

What is claimed is:

1. A plug filter assembly for communicating air from an axle spindle upstream to a rotary union assembly downstream in a central tire inflation system comprising a plug, a filter, and bolts, wherein said bolts extend longitudinally through said plug filter assembly and are made of electrically conductive material, and wherein each of said bolts comprise a first electrical terminal connection on its upstream end and a second electrical terminal connection on its downstream end.

2. An expansion plug filter assembly adapted to be mounted in an axle spindle for communicating filtered air from the axle to a rotary union assembly in a tire inflation system, said expansion plug filter assembly comprising a head portion, a body portion, an internal air flow channel extending longitudinally through said head and body portions, an internal annular seal disposed within said assembly about said channel, an external annular seal disposed about said head portion for forming an airtight seal with said axle spindle, a press plug cavity disposed in a downstream portion of said head portion, a press plate disposed in said cavity and defining a channel extending therethrough in axial alignment with said internal air flow channel, a plurality of securement bolts carried by said head portion and extending longitudinally therefrom through said press plate such that upon tightening said bolts, said plate is drawn into said press plate cavity, causing a downstream end portion of said head portion to expand against said spindle and releasably secure said expansion plug assembly within said spindle, and a filter element removably secured to an upstream end portion of said body portion of said expansion plug assembly.

3. The expansion plug filter assembly of claim 2 including a threaded filter receptacle in said upstream end portion of said body portion of said assembly, and wherein said filter element threadably engages said receptacle.

4. The expansion plug filter assembly of claim 2 wherein said press plate and said press plate cavity each define tapered annular wall portions, said wall portions being inclined such that upon said press plate being drawn into said cavity, the annular wall portion of said press plate bears against the annular wall portion of said cavity and causes said annular wall portion of said cavity to expand outwardly against said spindle to releasably secure said expansion plug assembly within said spindle.

5. The expansion plug filter assembly of claim 2 wherein said filter element is a 10 micron filter.

6. The expansion plug filter assembly of claim 4 including a threaded filter receptacle in said upstream end portion of said body portion of said assembly, and wherein said filter element threadably engages said receptacle.

7. The expansion plug filter assembly of claim 6 wherein said filter element is a 10 micron filter.

8. The expansion plug filter assembly of claim 6 wherein said press plate and said press plate cavity each define tapered annular wall portions, said wall portions being inclined such that upon said press plate being drawn into said cavity, the annular wall portion of said press plate bears against the annular wall portion of said cavity and causes said annular wall portion of said cavity to expand outwardly against said spindle to releasably secure said expansion plug assembly within said spindle.

9. The expansion plug filter assembly of claim 2 wherein said bolts are made of an electrical conductive material and each of said bolts comprises a first electrical terminal connection on its upstream end and a second electrical terminal connection on its downstream end.

10. The expansion plug filter assembly of claim 2 wherein said external annular seal comprises an o-ring mounted in a groove extending about said head portion.

11. An expansion plug filter assembly adapted to be mounted in an axle spindle for communicating filtered air from the axle to a rotary union assembly in a tire inflation system, said expansion plug filter assembly comprising a head portion, a body portion, an internal air flow channel extending longitudinally through said head and body portions, an internal annular seal disposed within said assembly about said channel, an external annular seal disposed about said head portion for forming an airtight seal with said axle spindle, a press plug cavity disposed in a downstream portion of said head portion, a press plate disposed in said cavity and defining a channel extending therethrough in axial alignment with said internal air flow channel, a securement bolt assembly operatively connected between said head portion and said press plate such that upon tightening said assembly, said plate is drawn into said press plate cavity, causing a downstream end portion of said head portion to expand against said spindle and releasably secure said expansion plug assembly within said spindle, and a filter element removably secured to an upstream end portion of said body portion of said expansion plug assembly.

12. The expansion plug filter assembly of claim 11 including a threaded filter receptacle in said upstream end portion of said body portion of said assembly, and wherein said filter element threadably engages said receptacle.

13. The expansion plug filter assembly of claim 11 wherein said press plate and said press plate cavity each define tapered annular wall portions, said wall portions being inclined such that upon said press plate being drawn into said cavity, the annular wall portion of said press plate bears against the annular wall portion of said cavity and causes said annular wall portion of said cavity to expand outwardly against said spindle to releasably secure said expansion plug assembly within said spindle.

14. The expansion plug filter assembly of claim 11 wherein said filter element is a 10 micron filter.

15. The expansion plug filter assembly of claim 13 including a threaded filter receptacle in said upstream end portion of said body portion of said assembly, and wherein said filter element threadably engages said receptacle.

16. The expansion plug filter assembly of claim 15 wherein said filter element is a 10 micron filter.

17. The expansion plug filter assembly of claim 15 wherein said press plate and said press plate cavity each define tapered annular wall portions, said wall portions being inclined such that upon said press plate being drawn into said cavity, the annular wall portion of said press plate bears against the annular wall portion of said cavity and causes said annular wall portion of said cavity to expand outwardly against said spindle to releasably secure said expansion plug assembly within said spindle.

18. The expansion plug filter assembly of claim 11 wherein said bolts are made of an electrical conductive material and each of said bolts comprises a first electrical terminal connection on its upstream end and a second electrical terminal connection on its downstream end.

19. The expansion plug filter assembly of claim 11 wherein said external annular seal comprises an o-ring mounted in a groove extending about said head portion.

20. An expansion plug filter assembly adapted to be mounted in an axle spindle for communicating filtered air from the axle to a rotary union assembly in a tire inflation system, said expansion plug filter assembly comprising a head portion, a press plate cavity, a filter unit, a press plate, an external o-ring mounted in a groove around said head portion for providing an airtight seal with the interior of said axle spindle, and a plurality of bolts embedded longitudinally through said head wherein tightening said bolt urges said press plate into said press plate cavity to expand a downstream end of said press plug assembly to provide a removable securement of said expansion plug assembly within the interior of said axle spindle.

21. An expansion plug filter assembly adapted to be mounted in an axle spindle for communicating filtered air from the axle to a rotary union assembly in a tire inflation system, said expansion plug filter assembly comprising a head portion having an internal air flow channel extending longitudinally therethrough, a press plate cavity communicating with said channel, a filter unit carried by said assembly in axial alignment with said channel, a press plate, an external annular seal disposed about said head portion for providing an airtight seal with the interior of said axle spindle, and a securement bolt assembly operatively connected between said head portion and said press plate such that upon tightening said assembly, said press plate is drawn into said press plate cavity to expand a downstream end of said press plug assembly to provide a removable securement of said expansion plug assembly within the interior of said axle spindle.

22. An expansion plug filter assembly adapted to be mounted in an axle spindle for communicating filtered air from the axle to a rotary union assembly in a tire inflation system, said expansion plug filter assembly comprising a head portion, a body portion, an internal air flow channel extending longitudinally through said head and body portions, an internal annular seal disposed within said assembly about said channel, an external annular seal disposed about said head portion for forming an airtight seal with said axle spindle, a press plug cavity disposed in a downstream portion of said head portion, a press plate disposed in said cavity and defining a channel extending therethrough in axial alignment with said internal air flow channel, a plurality of electrically conductive securement bolts carried by said head portion and extending longitudinally therefrom through said press plate such that upon tightening said bolts, said plate is drawn into said press plate cavity causing a downstream end portion of said head portion to expand against said spindle and releasably secure said expansion plug assembly within said spindle, and wherein each of said bolts comprise a first electrical terminal connection on its upstream end and a second electrical terminal connection on its downstream end, and a filter element removably secured to an upstream end portion of said body portion of said expansion plug assembly.

23. The expansion plug filter assembly of claim 22 including a threaded filter receptacle in said upstream end portion of said body portion of said assembly, and wherein said filter element threadably engages said receptacle.

24. The expansion plug filter assembly of claim 22 wherein said external annular seal comprises an o-ring mounted in a groove extending about said head portion.

25. The expansion plug filter assembly of claim 22 wherein said press plate and said press plate cavity each define tapered annular wall portions, said wall portions being inclined such that upon said press plate being drawn into said cavity, the annular wall portion of said press plate bears against the annular wall portion of said cavity and causes said annular wall portion of said cavity to outwardly expand against said spindle to releasably secure said expansion plug assembly within said spindle.

26. The expansion plug filter assembly of claim 23 wherein said filter element is a 10 micron filter.

\* \* \* \* \*